No. 757,229. PATENTED APR. 12, 1904.
A. ROUMIGUIÈRE.
ARTICHOKE TRIMMER.
APPLICATION FILED JAN. 2, 1903.
NO MODEL. 2 SHEETS—SHEET 2.
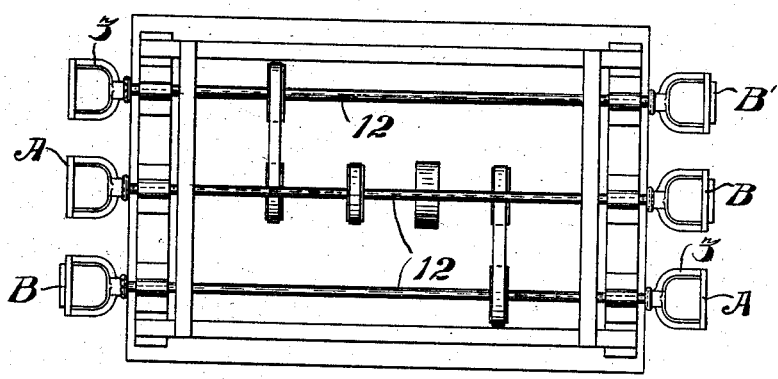
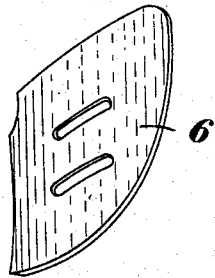
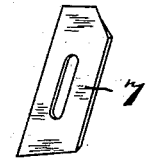
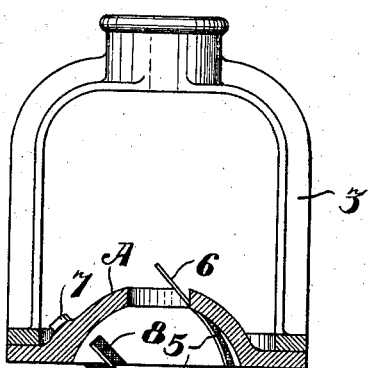
Witnesses,
Inventor,
Alphonse Roumiguière
By Geo. H. Strong.

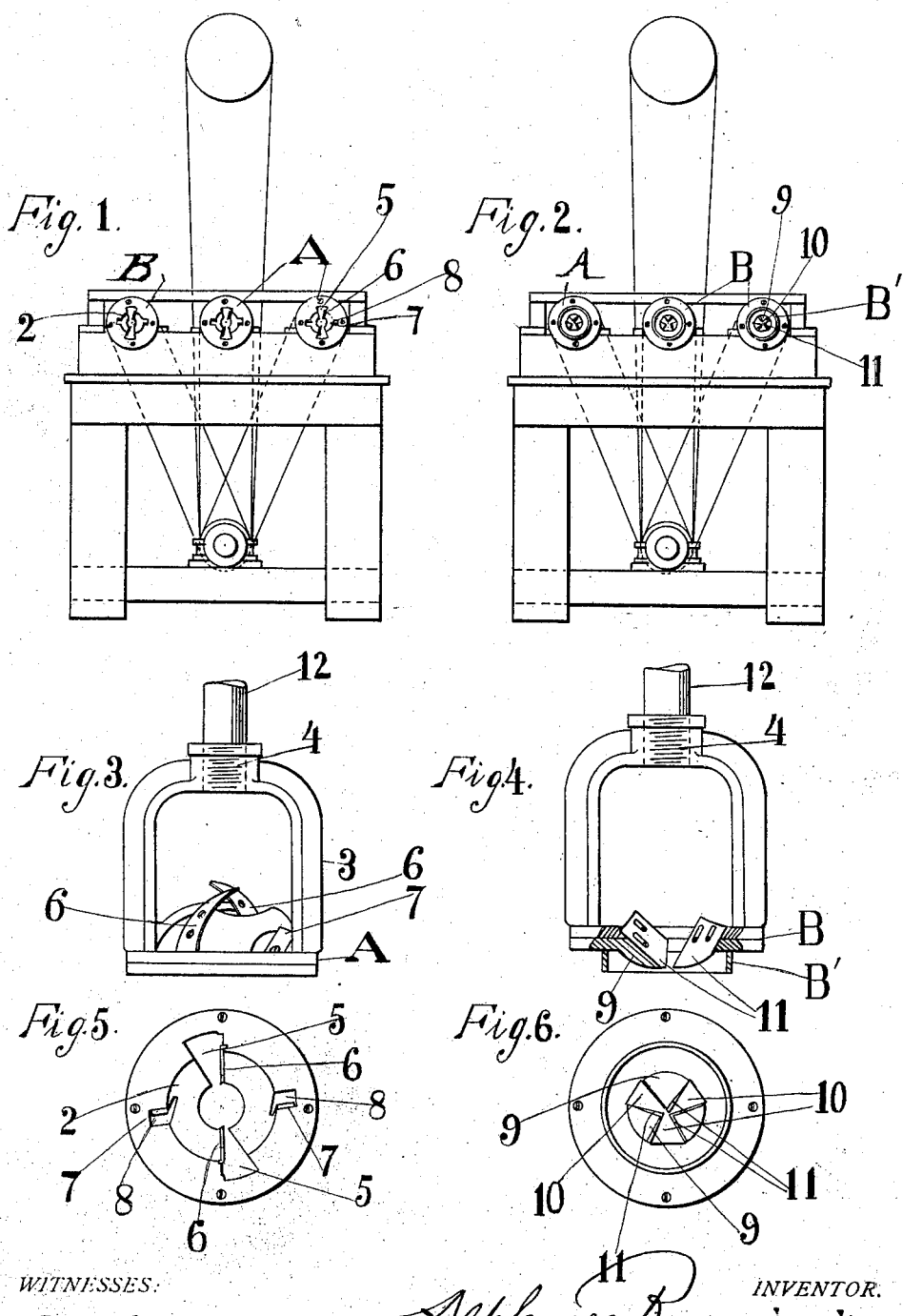

No. 757,229.

Patented April 12, 1904.

UNITED STATES PATENT OFFICE.

ALPHONSE ROUMIGUIERE, OF SAN FRANCISCO, CALIFORNIA, ASSIGNOR OF ONE-HALF TO ROBERT HICKMOTT, OF SAN FRANCISCO, CALIFORNIA.

ARTICHOKE-TRIMMER.

SPECIFICATION forming part of Letters Patent No. 757,229, dated April 12, 1904.

Application filed January 2, 1903. Serial No. 137,489. (No model.)

*To all whom it may concern:*

Be it known that I, ALPHONSE ROUMIGUIERE, a citizen of the United States, residing in the city and county of San Francisco, State of California, have invented an Improvement in Artichoke-Trimmers; and I hereby declare the following to be a full, clear, and exact description of the same.

My invention relates to an apparatus which is designed for preparing the vegetable known as "artichokes" for canning or for other purposes.

It consists of the parts and the constructions and combinations of parts, which I will hereinafter describe and claim.

Referring to the accompanying drawings, Figure 1 is a view of the first, and Fig. 2 is a view of the second, cutter. Figs. 3 and 4 are side elevations of the cutter-heads. Figs. 5 and 6 are plan views of same. Fig. 7 is a plan view of Fig. 1. Fig. 8 is a part elevation and part sectional view of one of the cutter-heads. Fig. 9 is a detail of one of the cutters 6. Fig. 10 is a detail of one of the cutters 7.

The artichoke is a vegetable having a soft interior composed of a base which is edible, a cottony upper portion which is not desirable, and an exterior covering of overlapping leaves.

It is the object of my invention to first remove these leaves, then extract that portion of the interior which is not desirable, leaving the edible base portion in proper condition for canning. For this purpose I have designed the apparatus which is hereinafter described.

A and B are two heads, which are here shown as being made circular or disk form. The head A has its central portion made concave, as shown at 2, with a central opening of sufficient size to admit the stem of an artichoke. This head is fixed to a yoke 3 of sufficient length having at its inner end a screw-socket or other suitable means for connecting it with a driving-shaft, as at 4. The length of the yoke is sufficient to allow the stem of the artichoke passing through the center of the concave to extend as far as may be desired, the stem being cut off short enough so as not to strike the inner end of the yoke. The concave is made with two slots or openings 5 at opposite sides, and into these slots or openings project the edges of corresponding concaved knives or cutters 6. These knives or cutters are adjustably secured to the rear portion or outside of the concave, as shown, and may be at any time adjusted to project as much as is necessary into the concavity. 7 represents other cutters projecting through slots, as at 8, made in the face of the disk intermediate between the open slots 5, previously described. These two sets of approximately equally interspaced cutters act to trim the leaves from the base of the artichoke as follows: The head being rapidly revolved by any suitable mechanism, the operator seizes the artichoke by the leaves at the outer end and inserts the stem through the central opening of the concavity of the disk, pushing the base of the artichoke down so that the rapidly-revolving cutters will sever the leaves around the base of the artichoke until the interior edible portion of the base is exposed and trimmed into a convex shape corresponding with the interior of the cone. The artichoke is then removed and reversed, the operator taking hold of the stem, and it is then inserted in the second disk B, after first cutting off the outer end and leaves. This second disk B has an annular rim B', within which is a convex projection which is practically formed of three or other suitable number of tongues 9, converging to the center and having open spaces between them, as shown at 10.

11 represents knives bolted upon the back of the convex tongues and adjustable thereon, so that their sharpened edges, which are made convex to coincide with the shape of the convexity of the disk, project sufficiently to cut away the inner portion of the artichoke when the latter is pressed into the annular ring and against these convex cutters. The portion to be cut away consists of an interior cottony substance and this action leaving the edible and desirable portion of the vegetable in the form of concavo-convex segments, which are then in condition for cooking and for canning or other uses.

The central opening of the concaved disk A serves as a guide to receive the stem of the artichoke and hold it in position while the base leaves are being cut off, and the annular ring B' of the disk B serves as a guide to hold the outer end or tip of the artichoke in place while the outer leaves and valueless center are being cut out.

The cutters may be arranged in any suitable or desired manner. I have found that a very suitable way is to secure the disks by means of yokes, as heretofore described, upon the ends of shafts, as at 12, which are journaled upon a suitable frame, and these cutters may be conveniently mounted in groups of three, more or less, made of different sizes, so that small, intermediate, and large artichokes can be operated upon by inserting them into the cutters which are the proper size to fit them. The cutters are all driven in unison by belts operating from a counter-shaft which is driven from any suitable source of power.

Having thus described my invention, what I claim, and desire to secure by Letters Patent, is—

1. A device for trimming artichokes and the like including a head having a central portion made concaved and with a central opening for receiving the stem of the artichoke, said concaved portion provided with slots at opposite sides with other slots at points intermediate of the first-named slots; cutters projecting into said first-named slots and adjustably secured to the rear outside portion of the concaved portion, and conforming substantially to the curvature thereof; other cutters fitting the second-named slots; and means for rotating said head.

2. A device for trimming artichokes and the like including a cutter-head having an outwardly-presented convex portion with a central opening said head having, also, an annular rim surrounding its convex portion; cutters secured in the convex portion of the cutter-head and provided with convex edges; and means for rotating the cutter-head.

3. A device for trimming artichokes and the like including cutter-heads having yokes and having outwardly-presented convex portions with centrally-located openings; outwardly-converging cutters secured in said convex portion and provided with convex cutting edges; means adjustably securing the cutters to the head; and means for rotating the yokes.

4. An artichoke-trimmer comprising cutter-heads having outwardly-presented concaved portions to receive the vegetable, and central openings to receive the stems thereof; other cutter-heads having outwardly-presented convex portions with central openings; cutting appliances positioned in the concaved and convex portions; and means for rotating the heads.

5. A device for trimming artichokes including a disk having a plane exterior portion, a concave portion interior thereto, with a central opening, and slots radiating to the outside of the concave portion, knives adjustably fixed with their cutting edges projecting into the concavity, and other knives projecting through the plane surface to operate in unison with the first-named knives.

In witness whereof I have hereunto set my hand.

ALPHONSE ROUMIGUIERE.

Witnesses:
S. H. NOURSE,
JESSIE C. BRODIE.